(12) United States Patent
Derrick et al.

(10) Patent No.: US 6,286,859 B2
(45) Date of Patent: Sep. 11, 2001

(54) GAS BAG MODULE

(75) Inventors: John-Oliver Derrick, Hettstadt; Dao-Xuan Phon, Offenbach, both of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/761,914

(22) Filed: Jan. 17, 2001

(30) Foreign Application Priority Data

Jan. 21, 2000 (DE) .......................................... 200 04 076 U

(51) Int. Cl.$^7$ ..................................................... B60R 21/16
(52) U.S. Cl. ..................... 280/728.2; 280/728.3; 280/743.2; 411/501
(58) Field of Search .............................. 280/728.1, 728.2, 280/728.3, 743.2; 411/501, 502, 505

(56) References Cited

FOREIGN PATENT DOCUMENTS

| 3531532 | 3/1987 | (DE) . |
|---|---|---|
| 29607536 | 9/1996 | (DE) . |
| 19829755 | 1/2000 | (DE) . |
| 19929762 | 1/2000 | (DE) . |

*Primary Examiner*—Eric Culbreth
(74) *Attorney, Agent, or Firm*—Tarolli, Sundheim, Covell, Tummino & Szabo L.L.P.

(57) ABSTRACT

The invention relates to a gas bag module, comprising at least one mounting part and at least one piece of fabric material which is stressed on activation of the gas bag module and which is provided with at least one opening. The gas bag module further comprises a force-transmitting device by which the piece of fabric material is fastened to the mounting part. The device comprises a first rivet reinforcing the opening in the piece of fabric material, and a second rivet penetrating the first rivet and connecting the piece of fabric material with the mounting part.

9 Claims, 2 Drawing Sheets

GAS BAG MODULE

TECHNICAL FIELD

The invention relates to a gas bag module.

BACKGROUND OF THE INVENTION

In conventional gas bag modules having a mounting part, tethers or the gas bag itself must be fastened very securely and hence in a costly manner to the mounting part, so that they are not detached from their anchoring on activation of the gas bag module, in which process they are stressed in a tensile manner. This detachment from the anchoring can take place for example by a tearing out of the piece of fabric, i.e. of the tether or of the gas bag.

BRIEF SUMMARY OF THE INVENTION

The invention provides a gas bag module in which the piece of fabric material is fastened more securely to the mounting part and, furthermore, can also be mounted more simply in the gas bag module. This is achieved in a gas bag module which comprises at least one mounting part and at least one piece of fabric material which is stressed on activation of the gas bag module and which is provided with at least one opening. The gas bag module further comprises a force-transmitting device by which the piece of fabric material is fastened to the mounting part. The device comprises a first rivet reinforcing the opening in the piece of fabric material, and a second rivet penetrating the first rivet and connecting the piece of fabric material with the mounting part. In the gas bag module according to the invention, the piece of fabric is reinforced by the first rivet on the one hand, so that a tearing out is no longer so easily possible, and on the other hand the second rivet, which serves for the actual fastening of the piece of fabric material to the mounting part, can be more easily mounted. The latter advantage results from the fact that hitherto always the rivet had to be inserted through the unstable piece of fabric material and the mounting part, which was possible with difficulty with the frequently difficult accessibility of the corresponding openings on the mounting part. In the gas bag module according to the invention, however, the first rivet serves at the same time as a guide for the second rivet, which can be inserted very simply through the first rivet.

The piece of fabric material is preferably a gas bag or a tether.

In the preferred embodiment, the first rivet connects a part of plastic with the piece of fabric material to form a unit. This unit is then fastened to the mounting part by the second rivet. The fastening of the piece of fabric material and the plastic part hitherto had only to take place with the fastening of these parts to the mounting part, which is often very difficult because the plastic part is usually provided with openings which are undersized compared with the rivet, so that in the fastened state it does not have any play under any circumstances. However, as stated, this makes the mounting of the rivet more difficult. In the preferred embodiment, however, the first rivet is already guided through the plastic part and the unstable piece of fabric material, so that the second rivet can be easily directed through the first rivet before it is deformed.

The plastic part is usually a gas bag covering which forms a part of the gas bag module.

For better fastening of the piece of fabric material to the plastic part, provision is made furthermore that the piece of fabric material is turned over on the edge of the plastic part around the latter and thereby surrounds the edge. The first rivet extends through the piece of fabric material at both opposite sides of the plastic part and through the plastic part itself.

Another embodiment of the invention makes provision that the piece of fabric material is a gas bag which is fastened to the mounting part in the region of its inflation orifice.

DETAILED DESCRIPTION OF THE PREFERRED EMBODIMENTS

Figure 1:
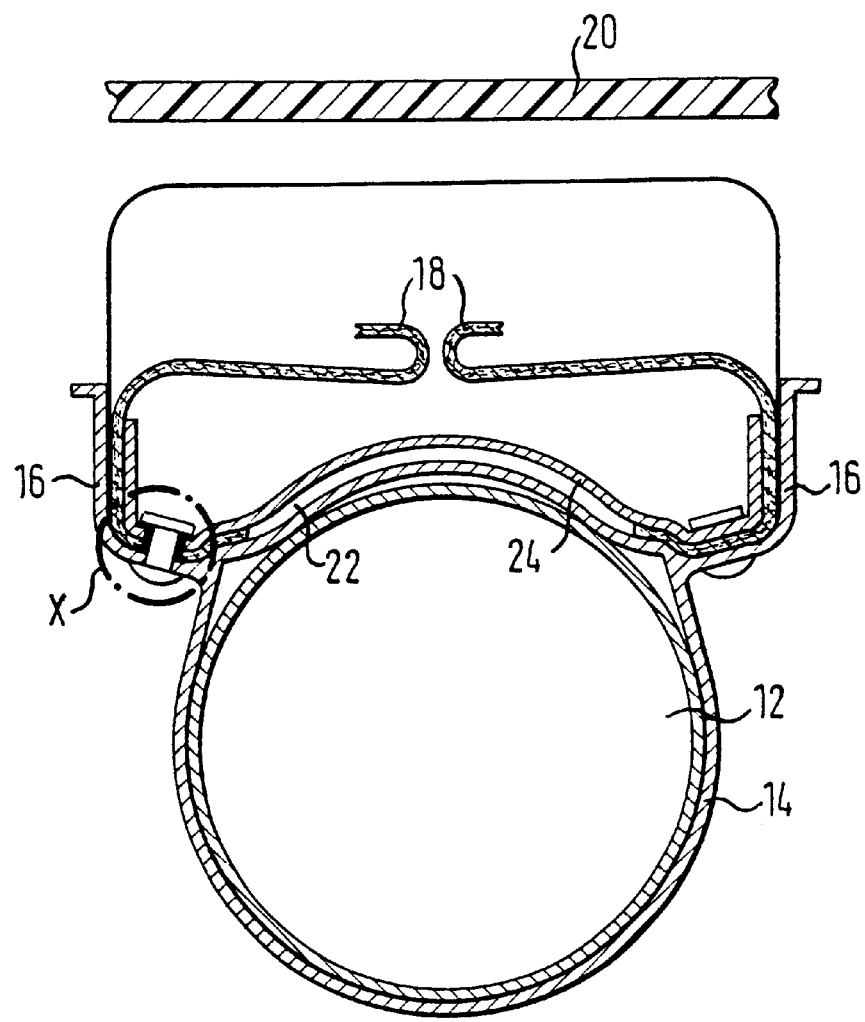
FIG. 1 shows a cross-sectional view through an embodiment of the gas bag module according to the invention.

In FIG. 1 a gas bag module is illustrated, which has a gas generator 12, a receiving housing 14 with a mounting part 16 in the form of a surrounding flange formed on in one piece, and a gas bag 18 as well as a module covering 20. The covering 20 is only illustrated in sections.

The gas bag 18 has an inflation orifice 22 via which the gas, which is generated in the gas generator 12, is blown in. The gas bag forms a piece of fabric material which is clamped by a mounting plate 24, inserted into the gas bag, against the mounting part 16. This clamping is achieved by a device. The corresponding fastening device is illustrated on an enlarged scale in FIG. 2 and is explained with the aid of this figure. The gas bag 18 is connected with the clamping plate 24 to form a unit, which takes place by a first hollow rivet 32, which in the set state penetrates an opening in the gas bag 18 and in the holding plate 24. The inner face of the rivet defines a through-opening 34. The then preassembled unit can be transported separately, without the danger existing that the holding plate 24 moves with respect to the gas bag 18. When mounting the formed unit on the mounting part 16, a second rivet 36, which represents a through-rivet, is inserted through the first rivet 32 and is then set, i.e. deformed at least at one end. The first rivet 32 serves as a guide for the rivet 36 on introduction of the still unset rivet 36. The progress after the opening of the covering 20 and unfolding of the gas bag in the region of the fastening of the gas bag to the mounting part 16 is distinctly improved through this arrangement of the rivets 32, 36, and a tearing out of the gas bag is made difficult.

Figure 2:
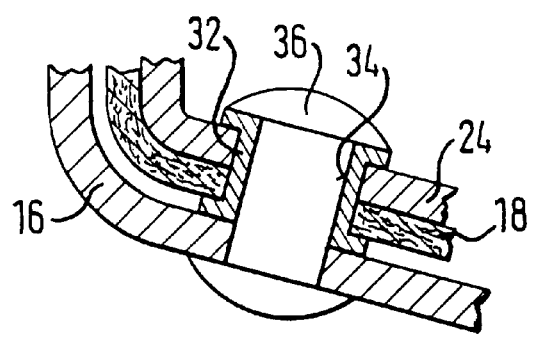
FIG. 2 shows an enlarged view of the region in FIG. 1 designated by X and surrounded by a circle, which shows the fastening of the gas bag to the generator carrier.
Figure 3:
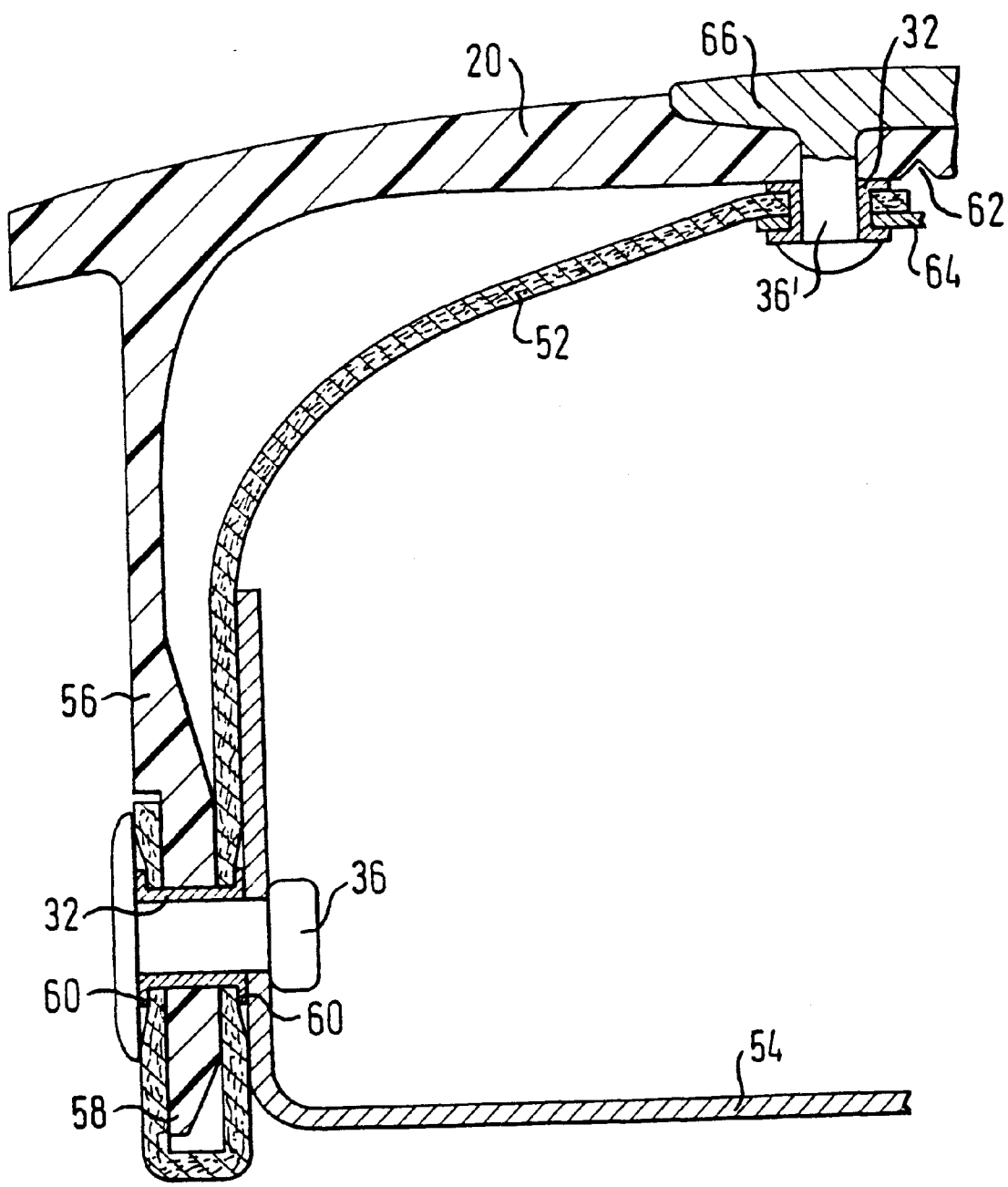
FIG. 3 shows a second embodiment of the gas bag module according to the invention, in which only the left-hand half of the module is illustrated.

In the second embodiment, which is illustrated in FIG. 3, the fabric material which is fastened by the device already explained in connection with FIG. 2, is a tether 52. The tether 52 is, to form a unit, affixed via the rivet 32 to a side wall 56 of the covering 20 formed by a plastic, so that side wall 56 and tether 52 form a preassembled unit. In addition, in the region of the lower edge 58 of the side wall, the tether 52 is placed around this edge by being folded over so that it lies against and covers opposed sides of the side wall 56. The rivet 32 engages with its outer regions 60, deformed radially outwards, on the outer faces of the tether 52.

The other end of the tether 52 is connected with the covering 20 in the region of a tear line 62 which is formed in the front wall of the covering 20, this connection likewise being able to take place through the device already described for fastening the fabric piece, here the tether 52. The tether 52 is connected at this end with a mounting plate 64 by means of the rivet 32 to form a unit. The first rivet, on the other hand, is formed in one piece to an emblem 66 (here the mounting part).

The emblem 66 is inserted through a corresponding opening in the covering 20. Then the unit of tether 52 and mounting plate 64 is put onto the rear, first rivet 36'. Finally the rivet 36' is deformed at the rear end.

The device for fastening the tether is highly stressed mechanically on opening of the covering 20, when the latter breaks open in the region of the tear line 62, because the tether 52 is intended to delimit the movement of the opening part of the covering 20 and must prevent a detachment of the emblem 66.

What is claimed is:

1. A gas bag module, comprising
    at least one mounting part,
    at least one piece of fabric material which is stressed on activation of said gas bag module and which is provided with at least one opening, and
    a force-transmitting device by which said piece of fabric material is fastened to said mounting part,
    the device comprising a first rivet reinforcing said opening in said piece of fabric material, and a second rivet penetrating said first rivet and connecting said piece of fabric material with said mounting part.

2. The gas bag module according to claim 1, wherein said piece of fabric material is a gas bag.

3. The gas bag module according to claim 1, wherein said piece of fabric material is a tether.

4. The gas bag module according to claim 1, wherein said mounting part is an emblem.

5. The gas bag module according to claim 1, wherein a separate adjoining part is provided and said piece of fabric material is fastened by said first rivet to said separate adjoining part to form a unit, and wherein said unit is fastened to said mounting part by said second rivet.

6. The gas bag module according to claim 5, wherein said part with which said piece of fabric material forms said unit is made of plastic.

7. The gas bag module according to claim 6, wherein it is provided with a covering, said part of plastic constituting said covering of said gas bag module.

8. The gas bag module according to claim 5, wherein on an edge of said separate adjoining part said piece of fabric material is folded over said edge and covers said part on opposite sides and wherein said first rivet holds together said folded-over section of said piece of fabric material and said part to form a unit.

9. The gas bag module according to claim 1, wherein said piece of fabric material is a gas bag having an inflation orifice, said gas bag being fastened in a region of said inflation orifice to said mounting part.

* * * * *